United States Patent [19]
Shirato et al.

[11] Patent Number: 5,626,765
[45] Date of Patent: *May 6, 1997

[54] METHOD FOR ADSORBING AND SEPARATING HEAVY METAL ELEMENTS BY USING A TANNIN ADSORBENT

[75] Inventors: Wataru Shirato; Yoshinobu Kamei, both of Ibaraki-ken, Japan

[73] Assignee: Mitsubishi Nuclear Fuel Company, Ltd., Tokyo, Japan

[*] Notice: The term of this patent shall not extend beyond the expiration date of Pat. No. 5,320,664.

[21] Appl. No.: 172,547

[22] Filed: Dec. 23, 1993

Related U.S. Application Data

[62] Division of Ser. No. 926,950, Aug. 10, 1992, Pat. No. 5,460,791.

[30] Foreign Application Priority Data

Aug. 23, 1991 [JP] Japan ................................. 3-237378

[51] Int. Cl.$^6$ ................................................. B01D 15/00
[52] U.S. Cl. .......................... 210/670; 210/682; 210/688
[58] Field of Search ................................. 210/670, 682, 210/688; 423/6, 11; 502/25, 27, 401

[56] References Cited

U.S. PATENT DOCUMENTS

| | | | |
|---|---|---|---|
| 3,925,192 | 12/1975 | Randall et al. | 210/688 |
| 4,824,576 | 4/1989 | Sood et al. | 210/670 |
| 5,104,549 | 4/1992 | Kamei et al. | 210/682 |
| 5,158,711 | 10/1992 | Shirato et al. | 252/631 |
| 5,296,629 | 3/1994 | Shirato et al. | 560/68 |
| 5,320,664 | 6/1994 | Shirato et al. | 75/711 |
| 5,460,791 | 10/1995 | Shirato et al. | 423/6 |

*Primary Examiner*—Ivars Cintins
*Attorney, Agent, or Firm*—McAulay Fisher Nissen Goldberg & Kiel, LLP

[57] ABSTRACT

A method of adsorbing and separating a heavy metal element by using a tannin adsorbent comprising:

(a) adjusting the pH of a solution containing a plurality of heavy metal elements to a predetermined pH;

(b) contacting the adsorbent with the solution in which the pH thereof is adjusted;

(c) adjusting the pH of the solution contacted with the adsorbent to a pH different from the predetermined pH; and (d) contacting the solution in which the pH thereof is adjusted at the step (d) with the adsorbent prepared at the step (a).

According to the inventive method, all of the heavy metal elements can be efficiently separated and adsorbed by using a tannin adsorbent from a solution containing a number of heavy metal elements. A method of regenerating a tannin adsorbent are also disclosed.

1 Claim, 2 Drawing Sheets

METHOD FOR ADSORBING AND SEPARATING HEAVY METAL ELEMENTS BY USING A TANNIN ADSORBENT

This is a division of application Ser. No. 07/926,950 filed Aug. 10, 1992, now U.S. Pat. No. 5,460,791.

BACKGROUND OF THE INVENTION

This invention relates to a method in which a solution containing a number of heavy metal elements, such as, actinides, e.g., uranium, thorium, transuranium elements, and the like, as well as lead, cadmium, chromium, mercury, iron, and the like, are contacted with a tannin adsorbent to adsorb the heavy metal elements onto the adsorbent, and separating the heavy metal elements from the solution.

Also, it relates to a method for eluting the heavy metal elements from the adsorbent having the heavy metal elements adsorbed therein so as to regenerate the adsorbent.

Unexamined Published Japanese Patent Application No. 3-206094 (U.S. patent application Ser. No. 07/631,946) of the present inventors, discloses a method for adsorbing a heavy metal element onto an adsorbent by contacting a solution containing a heavy metal element with a tannin adsorbent. In this method, tannin is dissolved in an aldehyde aqueous solution; ammonia is added to the resulting solution to form a precipitate; and the precipitate is aged to obtain an insoluble tannin which can adsorb nuclear fuel elements or iron ions.

The inventors have also disclosed a method for regenerating a tannin adsorbent having adsorbed actinides therein by contacting the adsorbent with a dilute mineral acid to elute the actinides therefrom when the adsorbing ability of the tannin adsorbent is lowered (Unexamined Published Japanese Patent. Application No. 3-293597).

However, a problem occurs in the former method when a waste liquid containing a number of heavy metal elements is treated, because an adsorbent capable of adsorbing all of the heavy metal elements has not been known. It has thus been impossible to efficiently separate all the heavy metal elements from the waste liquid with a single adsorbant.

A problem with the latter method is that when the adsorbent is regenerated by using the dilute mineral acid, the extent of regeneration in the adsorbent varies since the elution rates of the adsorbed actinides are different each other.

SUMMARY OF THE INVENTION

An object of this invention is to provide a method for adsorbing and efficiently separating heavy metal elements from a solution thereof using a tannin adsorbent.

Another object of this invention is to provide a method for regenerating a tannin adsorbent by efficiently eluting heavy metal elements adsorbed on the adsorbent.

These objects are achieved by methods based on the present inventors' discovery that the adsorption rate of a heavy metal element adsorbed by a tannin adsorbent varies with the pH of the solution containing the heavy method element and the elution rate of a heavy metal element eluted from the adsorbent varies with the pH of a solution contacted with the adsorbent.

More particularly, the inventors have discovered a method for adsorbing and separating a heavy metal element from a solution of a plurality of said heavy metal elements using a tannin adsorbent comprising the steps of:

(a) adjusting the pH of the solution to a first predetermined value known to be suitable for adsorption of at least one of the elements therein;

(b) contacting a tannin adsorbent with the solution from step (a) to adsorb the element thereon;

(c) adjusting the pH of the solution from step (b) to a second predetermined value known to be suitable for adsorption of another one or more said elements;

(d) contacting a tannin adsorbent with the solution from step (c) to adsorb the other elements; and (e) repeating steps (c) and (d) if desired to adsorb any one or more of the elements remaining in the solution.

The inventors have further discovered a method for regenerating the adsorbent comprising the steps of:

contacting the tannin from steps (b) and/or (d) above with an aqueous alkaline or mineral acid solution having a pH different from that suitable to adsorb a desired element and to desorb the element of that group from the adsorbent into the solution; and separating the adsorbent from the solution.

This process may be repeated to desorb another element from the adsorbent by adjusting the pH of the acid or alkaline solution to a value suitable to desorb the other element(s) and contacting the adsorbent with the liquid, followed by separation of the adsorbent from the liquid. The adsorbent may be washed with pure water between each separation.

DESCRIPTION OF THE PREFERRED EMBODIMENT

Tannin adsorbents suitable for use in this invention include adsorbents having, as a main component, an insoluble tannin and a gelled tannin. Examples of the insoluble tannin include a tannin described in Unexamined Published Japanese Patent Application No. 3-206094 (U.S. patent application Ser. No. 07/631,946), prepared by dissolving a tannin in an aldehyde aqueous solution, adding ammonia to the resulting solution to form a precipitate, and aging the precipitate. As the gelled tannin, a tannin prepared by dissolving a condensed tannin powder in aqueous ammonia, mixing the resulting solution with an aqueous aldehyde solution to form a gel composition, and aging the gel composition to stabilize it can be used. The present applicants have filed U.S. patent applications Ser. Nos. 07/631,946 and 07/906,273 the contents of which are incorporated herein by reference) concerning such tannin adsorbents.

The solution to be treated in this invention contains one or more and usually a plurality of heavy metal elements. Representative examples of the heavy metal elements include actinides (uranium, thorium, and the transuranium elements), lead cadmium, chromium, mercury, iron, and the like. The pH of the solution is adjusted according to the heavy metal elements in the solution, prior to contacting the solution with the tannin adsorbent. Thus, the pH is adjusted to a value which is suitable to maximizing the adsorption of the specific element or elements desired to be adsorbed in that step.

For example, (1) when uranium, neptunium, americium, and curium are separated from a solution containing all of these elements, the pH of the solution is first adjusted to a range of 6 to 10 to adsorb and separate uranium and neptunium by using the tannin adsorbent and subsequently the pH of the solution is adjusted to a range of 3 to 6 to adsorb and separate americium and curium by using the tannin adsorbent. The variation of the adsorption rate in which such heavy metal elements are adsorbed by the tannin adsorbent is shown in FIG. 1.

In addition, (2) when lead, cadmium, hexavalent chromium, mercury, and iron are separated from a solution containing all of these elements, first the pH of the solution is adjusted to 7 or more to adsorb and separate mainly lead and cadmium by using the tannin adsorbent and subsequently, the pH of the solution is adjusted to a range of 3 to 6 to adsorb and separate hexavalent chromium, mercury, and iron by using the tannin adsorbent. The variation of the adsorption rate in which such heavy metal elements are adsorbed by the tannin adsorbent is shown in FIG. 2.

Further, when a solution which contains simultaneously both the elements of the item (1) and the elements of the item (2) is treated, or when all of the heavy metal elements are to be separated with high adsorption rate, it is preferred that the pH of the solution is more precisely adjusted and, subsequently, the adjusted solution is contacted with the tannin adsorbent.

Figure 1:
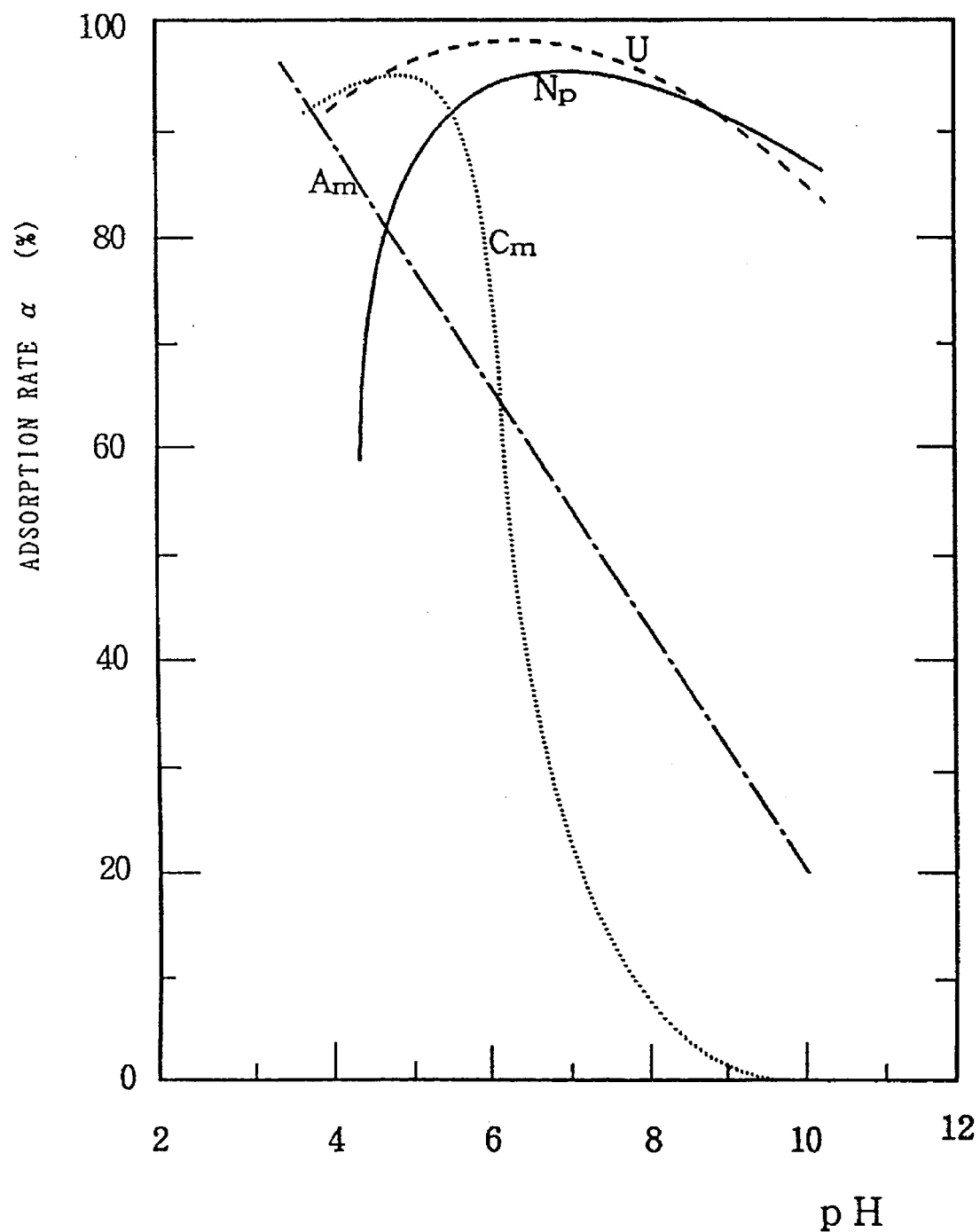
FIG. 1 is a graph showing the variation of adsorption rate with pH for a tannin adsorbent and a variety of heavy metal elements in a solution.
Figure 2:
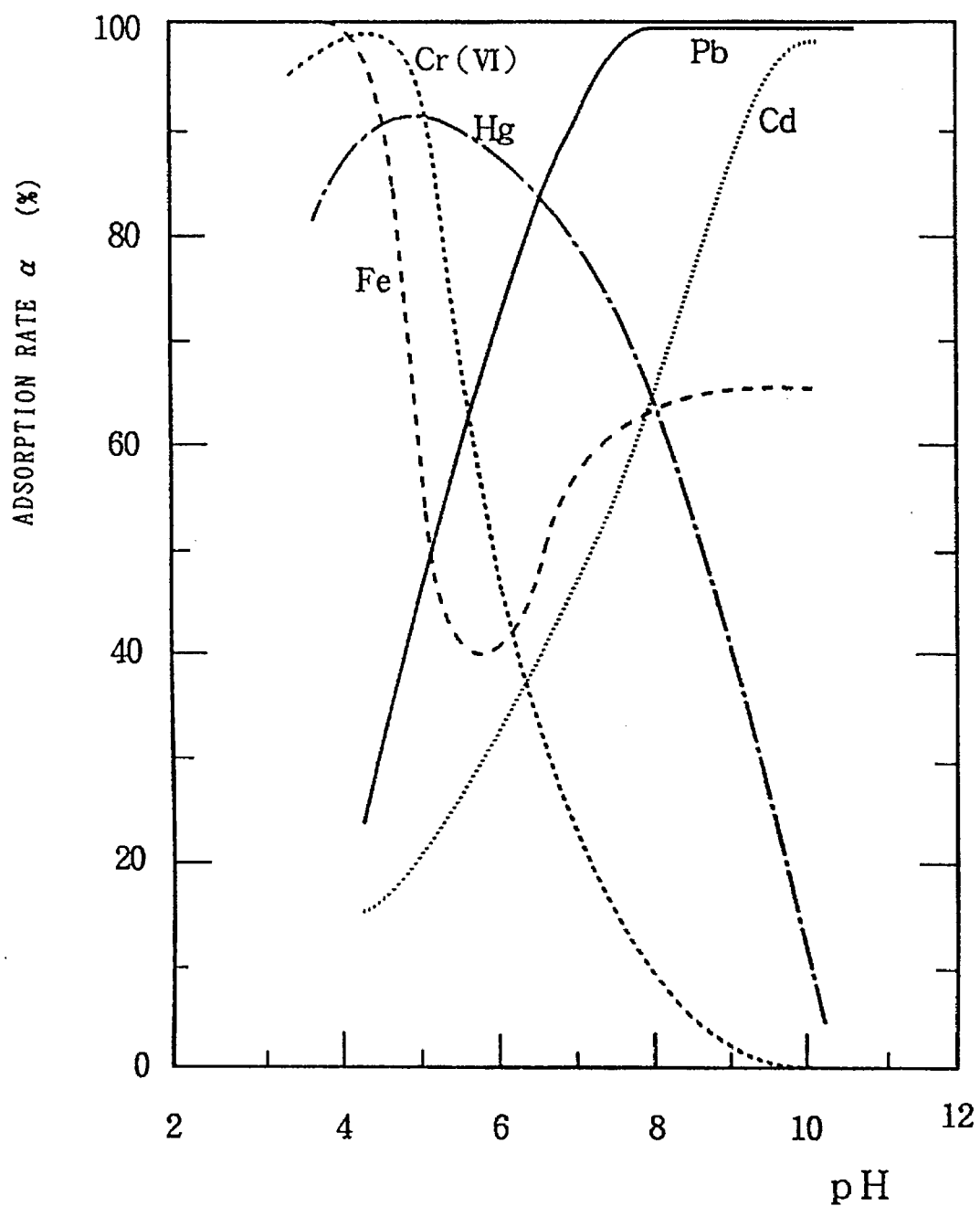
FIG. 2 is a graph similar to that of FIG. 1 for another variety of heavy metal elements.

In FIGS. 1 and 2, $\alpha$ stands for an adsorption rate which is calculated from the following formula.

$$\alpha = [(Co-Ct)/Co] \times 100(\%)$$

wherein Co represents the heavy metal concentration of the starting liquid before adding an adsorbent thereto; Ct represents the heavy metal concentration of the solution after adsorbing the heavy metal by adding an insoluble tannin thereto.

A specific method for contacting the adsorbent with the solution includes a first method comprising packing a tannin adsorbent in a column, and passing a solution containing a heavy metal element through the column. A second method comprising adding a tannin adsorbent to a solution containing a heavy metal element, e.g., in a vessel, whereby the heavy metal element is adsorbed by the adsorbent.

In more detail, the former method comprises the steps of:
(f) preparing a plurality of columns;
packing the tannin adsorbent in each of the respective columns;
(h) passing a solution containing heavy metal elements in which the pH thereof is adjusted to a predetermined value so as to favor adsorption of one or more of the heavy metal elements through one of the plural columns;
(i) adjusting the pH of the solution discharged from the column to a second different pH to favor adsorption of one or more of the other metals therein; and
(j) passing the solution from step (i) through one of the unused columns.

In the former method, steps (i) and (j) are repeated at least once and the pH of the respective solutions in each step is different from one another, whereby the adjustment of the pH can be precisely carried out with a number of steps.

The latter method comprises the steps of:
(k) preparing the tannin adsorbent;
(l) adjusting the pH of a solution containing a plurality of heavy metal elements to a predetermined pH so as to favor adsorption of one or more of the elements;
(m) adding the adsorbent to the solution from step (k);
(n) separating the adsorbent from the solution to which the adsorbent is added;
(o) adjusting the pH of the separated solution to a second different pH to favor adsorption of one or more of the other metals therein; and
(p) adding the adsorbent from step (k) to the solution from step (o).

In the latter method, steps (o) and (p) are repeated at least once and the pH of the respective solutions in each step is different from one another, whereby the adjustment of the pH can be precisely carried out with a number of steps. Separating step (n) can be carried out by filtration, centrifugation, and the like.

Factors to be considered in determining whether the former method or the latter method should be used include the amount of the solution to be treated, the treating time to be required, the kinds of heavy metal elements contained in the solution, the property or form of the tannin adsorbent to be used, and the like. For example, a gelled tannin which is prepared by stabilizing the above-mentioned gel composition is used in a pulverized state when it is contacted with the solution. Since the gel tannin is superior to other adsorbents in flow resistivity, when the gelled tannin is used in the former method, it can efficiently adsorb the heavy metal elements.

This invention also provides a method of eluting a heavy metal element from the adsorbent to regenerate the adsorbent comprising the steps of:
(q) washing an adsorbent from step (b) or step (d) with pure water;
(r) contacting the washed adsorbent with a mineral acid aqueous solution or an alkaline aqueous solution, each having a pH different from that of the solution of step (b) or step (d) so as to desorb the element into the solution, and separating the adsorbent therefrom; and
(s) further washing the adsorbent contacted with the aqueous solution with pure water.

This invention further provides a method in which a heavy metal element is adsorbed in a column packed with the adsorbent and subsequently the adsorbent is regenerated comprising the steps of:
(t) packing the tannin adsorbent in a column;
(u) passing the solution containing a plurality of heavy metal elements through the column, the pH of the solution being adjusted to a predetermined value favoring adsorption of one or more of the elements;
(v) washing the column from step (u) with pure water;
(w) passing an aqueous mineral acid solution or an aqueous alkaline solution, each having a pH favoring desorbtion of the element and different from that of the solution adjusted at step (u) through the washed column.
(x) washing the column from step (w) with pure water;
(y) adjusting the pH of the solution discharged from the column at step (u) to a pH favoring adsorption of one or more elements different from the element(s) adsorbed in step (u) and different from the predetermined pH; and
(z) passing the solution from step (y) through the column from step (x).

In the regenerating method, steps (v), (w), (x), (y) and (z) are repeated at least once and the pH of respective solutions in each step is different from one another, whereby the adjustment of the pH can be precisely carried out with a minimum number of steps. With the inventive regenerating method, adsorption of the heavy metal element and regeneration of the used adsorbent can be carried out with a minimal amount of equipment.

By using a regenerating method other than a method in which a solution containing heavy metal elements is passed through a column packed with the adsorbent, it is also possible to regenerate the adsorbent which has adsorbed a heavy metal element and was subsequently filtered. This regenerating method comprises the steps of adding a tanning adsorbent to a first solution containing a heavy metal element in which the pH thereof is adjusted to thereby adsorb the heavy metal element; filtering the mixed solution to leave a residue on a filter; washing the residue with pure water, separating the residue from the washings; contacting the separated residue with an aqueous mineral acid solution or an alkaline solution, each having a pH different from that of the first solution and favoring desorbtion of the element separating the residue and washing the separated residue with pure water.

When a plurality of heavy metal elements are adsorbed, the pH of a solution containing these metal elements is adjusted to, for example, pH 8, followed by contacting the solution with a tannin adsorbent, so that a heavy metal element having high adsorption rate at pH 8 is adsorbed thereto. Subsequently, the pH of the residual solution is adjusted to a pH different from that of the above solution, for example, pH 5, followed by contacting the solution with a tannin adsorbent, so that another heavy metal element having high adsorption rate at pH 5 is adsorbed thereto. It follows that a plurality of heavy metal elements can be efficiently adsorbed onto the adsorbent and separated from the solution containing the heavy metal elements.

When the adsorbent is regenerated, and for example, when the adsorbent is contacted with a solution containing a heavy metal having pH 8, the adsorbent which adsorbs the heavy metal element is contacted with a mineral acid aqueous solution having a pH different from pH 8, for example, pH 5, thereby desorbing or eluting the heavy metal element therefrom. In addition, when the adsorbent is regenerated, for example, when the adsorbent is contacted with a solution containing a heavy metal having pH 5, the adsorbent which adsorbs the heavy metal element is contacted with an alkaline aqueous solution having a pH different from the pH 5, for example, pH 8, thereby eluting or desorbing the heavy metal element therefrom.

As mentioned above, according to this invention, by taking advantage of the pH dependence of the adsorption rate and elution rate of a tannin adsorbent, all of the heavy metal elements can be efficiently adsorbed on the adsorbent, and each of the heavy metal elements thus adsorbed can be independently eluted therefrom with high elution rates.

In the inventive method, both continuous and batch methods can be easily carried out by using a single adsorbent and by only adjusting the pH, so that the apparatus to be used for the inventive method is not complicated.

Further, the inventive method can rapidly handle a solution containing both uranium and thorium, which are generated from a nuclear fuel manufacturing process; a solution including simultaneously the transuranium elements generated from fuel reprocessing process, such as, curium, americium, neptunium, and plutonium; as well as a solution containing simultaneously lead, cadmium, hexavalent chromium, mercury, and iron, which are generated from processes handling a heavy metal element.

The present invention is described in greater detail with reference to the following examples, although it is not limited thereto.

EXAMPLE 1

8 g of wattle tanning powder is dissolved in an aqueous solution containing 37 wt % formaldehyde. To the resulting solution were added 14 ml or more of 13.3N aqueous ammonia to precipitate a tannin compound, followed by filtering. The filtered precipitate was allowed to stand for four days at room temperature to age it, thereby obtaining a tannin adsorbent consisting of an insoluble tannin with a particle size of about 1.0 to 2.4 mm.

There was provided 200 ml of a mixed solution containing curium, americium, neptunium, and uranium. The mixed solution was prepared by uniformly mixing a solution having a curium ($244_{Cm}$) concentration of $3.5 \times 10^{-2}$ Bq/cm$^3$, a solution having a americium($241_{Am}$) concentration of $3.5 \times 10^{-2}$ Bq/cm$^3$, a solution having a neptunium($237_{Np}$) concentration of $3.5 \times 10^{-2}$ Bq/cm$^3$, and a solution having a uranium (U) concentration of $1.0 \times 10^{-1}$ Bq/cm$^3$. The concentration as the mixed solution was $2.05 \times 10^{-1}$ Bq/cm$^3$, and the mixed solution was strongly acidic having a pH of 2 or less.

To the mixed solution was added 13.3N aqueous ammonia to thereby make the pH 6.0. There were added 800 mg (dry weight) of the tannin adsorbent to the mixed solution in which the pH thereof was adjusted, followed by stirring for two hours at room temperature. The stirred mixed solution was filtered through filter paper (Toyo Filter Paper No.6), and the mixed concentration consisting of the curium, americium, neptunium, and uranium was measured. The mixed concentration was found to be $1.9 \times 10^{-2}$ Bq/cm$^3$ and the adsorption rate thereof was 90.73%. The respective concentrations of each element were measured so that the curium concentration was found to be $4.3 \times 10^{-3}$ Bq/cm$^3$ (adsorption rate 87.7%), the americium concentration to be $1.4 \times 10^{-2}$ Bq/cm$^3$ (adsorption rate 60.7%), the neptunium concentration to be $8.5 \times 10^{-4}$ Bq/cm$^3$ (adsorption rate 97.6%), and the uranium concentration to be $8.0 \times 10^{-5}$ Bq/cm$^3$ (adsorption rate 99.9%).

To the filtrate was added 13.3N nitric acid to thereby make the pH 3.5. There were added 800 mg (dry weight) of the tannin adsorbent to the filtrate in which the pH thereof was adjusted, followed by stirring for two hours at room temperature. The stirred mixed solution was filtered again through filter paper (Toyo Filter Paper No.6) as in the above, and the mixed concentration consisting of the curium, americium, neptunium, and uranium was measured. The mixed concentration was found to be $1.4 \times 10^{-3}$ Bq/cm$^3$ and the adsorption rate thereof was 92.6%. The respective concentrations of each element were measured, so that the curium concentration was found to be $6.4 \times 10^{-4}$ Bq/cm$^3$ (adsorption rate 88.1%), the americium concentration to be $6.3 \times 10^{-4}$ Bq/cm$^3$ (adsorption rate 95.5%), the neptunium concentration to be $1.4 \times 10^{-4}$ Bq/cm$^3$ (adsorption rate 83.5%), and the uranium concentration to be $3.0 \times 10^{-5}$ Bq/cm$^3$ (adsorption rate 62.5%). The concentration of uranium was measured using a fluorophotometer and the concentrations of elements other than uranium were measured using an alpha ray spectrometer. This indicates that when the mixed solution, the pH of which was adjusted to pH 6.0, and the filtrate, the pH of which was adjusted to pH 3.5, were adsorbed by the tannin adsorbent, respectively, uranium and three kinds of transuranium elements could be adsorbed by the tannin adsorbent with an extremely high adsorption rate within a relatively short period of time.

EXAMPLE 2

250 ml of a solution was prepared by uniformly mixing solutions having a lead concentration of 10 ppm, a cadmium concentration of 10 ppm, a hexavalent chromium concentration of 10 ppm, a mercury concentration of 10 ppm, and an iron concentration of 1 ppm. The total concentration of the respective heavy metal elements was 41 ppm.

To the mixed solution was added 13.3N aqueous ammonia to thereby make the pH 10.0. There were added 1000 mg (dry weight) of the tannin adsorbent obtained in Example 1 to the mixed solution in which the pH thereof was adjusted, followed by stirring for three hours at room temperature.

The stirred mixed solution was filtered through filter paper (Toyo Filter Paper No.6), and each concentration of the heavy metal elements in the filtrate was measured. As a result, the lead concentration was found to be 0.10 ppm (adsorption rate 99.0%), the cadmium concentration to be 0.30 ppm (adsorption rate 97.0%), the hexavalent chromium concentration to be 9.90 ppm (adsorption rate 1.0%), the mercury concentration to be 8.90 ppm (adsorption rate 11.0%), and the iron concentration to be 0.35 ppm (adsorption rate 65.0%). The total concentration of the heavy metal elements in the filtrate was 19.55 ppm and the adsorption rate thereof was 52.3%.

13.3N nitric acid was added to the filtrate to thereby make the pH 4.5. 1000 mg (dry weight) of the tannin adsorbent were added to the filtrate in which the pH thereof was adjusted, followed by stirring for three hours at room temperature.

The stirred mixed solution was filtered again through filter paper (Tokyo Filter Paper No.6) as in the above, and each concentration of lead, cadmium, hexavalent chromium, mercury, and iron in the filtrate was measured. As a result, the lead concentration was found to be 0.075 ppm (adsorption rate 25.0%), the cadmium concentration to be 0.255 ppm (adsorption rate 15.0%), the hexavalent chromium concentration to be 0.10 ppm (adsorption rate 99.0%), the mercury concentration to be 0.979 ppm (adsorption rate 89.0%), and the iron concentration to be 0.021 ppm (adsorption rate 94.0%). The total concentration of the respective heavy metal elements in the filtrate was found to be 1.43 ppm and the adsorption rate thereof was 92.7%, and the total adsorption rate obtained by adding the adsorbent twice was 96.5%.

This indicates that when the pH of the mixed solution was adjusted to 10, lead and cadmium were mainly adsorbed and separated from the mixed solution, and when the pH of the mixed solution was adjusted to 4.5, hexavalent chromium, mercury, and iron were mainly adsorbed and separated from the mixed solution. Thus, when the adsorption was repeated twice with the pH of the mixed solution being changed, five kinds of heavy metal elements could be separated with high adsorption rates as a whole.

EXAMPLE 3

An aqueous solution (250 ml) of chromium trioxides (hexavalent chromium concentration 18.0 ppm) in which the pH thereof is adjusted to 5.0 by using ammonia was prepared. To the aqueous solution were added 550 mg (dry weight) of the tannin adsorbent obtained in Example 1, followed by stirring for two hours at room temperature. The stirred mixed solution was filtered through filter paper (Toyo Filter Paper No.6), and the concentration of the hexavalent chromium in the filtrate was measured. As a result, the hexavalent concentration was found to be 0.2 ppm and the adsorption rate thereof was 98.9%.

The tannin adsorbent thus filtered was thoroughly washed with pure water, followed by filtering again. The refiltered adsorbent was added to 250 ml of aqueous sodium hydroxide solution of pH 10, followed by stirring for 30 minutes. The stirred solution was filtered, and the hexavalent chromium concentration of the filtrate was measured. The hexavalent chromium concentration was found to be 17.5 ppm and the elution rate thereof was 98.3%. The tannin adsorbent from which the hexavalent chromium was eluted was thoroughly washed with pure water, followed by filtering again to obtain a rewashed tannin adsorbent. In addition, 250 ml of an aqueous solution of cadmium chloride (cadmium concentration 15.0 ppm) in which the pH was adjusted to 10 with an aqueous sodium hydroxide solution. To the aqueous solution was added the rewashed tannin adsorbent, followed by stirring for two hours. The stirred mixed solution was filtered and the cadmium concentration of the filtrate was measured. As a result, the cadmium concentration was found to be 0.3 ppm and the adsorption rate thereof was 98.0%.

What is claimed is:

1. A method for adsorbing and separating a heavy metal element in a solution of one or more of said heavy metal elements using a tannin adsorbent comprising the steps of:

a) adjusting the pH of the solution to a first value predetermined to be conducive to the adsorption of at least one of the elements therein onto a tannin adsorbent;

b) contacting an adsorbent selected from the group consisting of insoluble tannin and gelled tannin with the solution from step a) to adsorb the element thereon; and c) contacting the adsorbent from step b) with an aqueous solution of a mineral acid or an aqueous alkaline solution having a pH conducive to desorb the metal element from the adsorbent.

* * * * *